(12) United States Patent
Hiura

(10) Patent No.: US 10,843,444 B2
(45) Date of Patent: Nov. 24, 2020

(54) LIQUID CHEMICAL AGENT PACKAGE AND PRODUCTION METHOD THEREFOR

(71) Applicant: Mitsubishi Chemical Corporation, Tokyo (JP)

(72) Inventor: Takahiro Hiura, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 33 days.

(21) Appl. No.: 16/448,507

(22) Filed: Jun. 21, 2019

(65) Prior Publication Data

US 2019/0315102 A1 Oct. 17, 2019

Related U.S. Application Data

(63) Continuation of application No. PCT/JP2017/046199, filed on Dec. 22, 2017.

(30) Foreign Application Priority Data

Dec. 27, 2016 (JP) ................. 2016-252833

(51) Int. Cl.
*B32B 27/08* (2006.01)
*B65D 65/46* (2006.01)
*C08L 29/04* (2006.01)

(52) U.S. Cl.
CPC .............. *B32B 27/08* (2013.01); *B65D 65/46* (2013.01); *B32B 2439/80* (2013.01); *C08L 29/04* (2013.01); *C08L 2203/162* (2013.01)

(58) Field of Classification Search
CPC ..... B32B 27/08; B32B 2439/80; B65D 65/46; C08L 29/04; C08L 2203/162
See application file for complete search history.

(56) References Cited

U.S. PATENT DOCUMENTS

| 5,384,364 A | 1/1995 | Besse et al. |
| 2004/0092635 A1 | 5/2004 | Kitamura et al. |

(Continued)

FOREIGN PATENT DOCUMENTS

| JP | H6-501276 | 2/1994 |
| JP | 2001-329130 | 11/2001 |

(Continued)

OTHER PUBLICATIONS

European Search Report issued for the European Patent Application No. 17885591.2 dated Dec. 9, 2019.

(Continued)

*Primary Examiner* — Michael C Miggins
(74) *Attorney, Agent, or Firm* — Greenblum & Bernstein, P.L.C.

(57) ABSTRACT

A liquid chemical agent package includes: a package bag obtained by bonding water-soluble films each containing a polyvinyl alcohol resin (A) to each other; and a liquid chemical agent included in the package bag, wherein in a section in a vertical direction relative to bonding surfaces of the water-soluble films, the liquid chemical agent package contains 20 or more inorganic particles each having a particle diameter of 2 μm or more in a sealed sectional portion having a range extending from an interface between the bonding surfaces by ±10 μm in the vertical direction and having a width of 900 μm. The liquid chemical agent package has water solubility but also high adhesiveness of a water-sealed portion and is hence excellent in sealability, and is hardly affected over time from the end of water application to water sealing and hence maintains high sealability.

7 Claims, 1 Drawing Sheet

(56) References Cited

U.S. PATENT DOCUMENTS

2008/0008873 A1    1/2008  Catalfamo
2014/0356603 A1    12/2014 Kumar et al.

FOREIGN PATENT DOCUMENTS

| JP | 2004-161823 | 6/2004 |
|----|-------------|--------|
| JP | 2006-257225 | 9/2006 |
| JP | 2009-541086 | 11/2009 |
| JP | 2016-529335 | 9/2016 |
| WO | 02/16205 | 2/2002 |
| WO | 03/008180 | 1/2003 |
| WO | 2014/197415 | 12/2014 |

OTHER PUBLICATIONS

Official Communication issued in International Patent Application No. PCT/JP2017/046199, dated Mar. 20, 2018.
English translation of IPRP issued in International Patent Application No. PCT/JP2017/046199, dated Jul. 11, 2019.

LIQUID CHEMICAL AGENT PACKAGE AND PRODUCTION METHOD THEREFOR

RELATED APPLICATION

This application is a continuation of International Application No. PCT/JP2017/046199, filed on Dec. 22, 2017, which claims priority to Japanese Patent Application No. 2016-252833, filed on Dec. 27, 2016, the entire contents of each of which being hereby incorporated by reference.

TECHNICAL FIELD

The present disclosure relates to a liquid chemical agent package obtained by including a liquid chemical agent in a water-soluble film containing a polyvinyl alcohol resin as a main component, and a method of producing the package. More specifically, the present disclosure relates to a liquid chemical agent package that has high adhesiveness between water-soluble films of a water-sealed portion at the time of water sealing, and is hence excellent in sealability, which is hardly affected by a lapse of a time period from an end of water application to the water sealing, and hence can maintain high sealability, and a method of producing the package.

A polyvinyl alcohol is hereinafter sometimes abbreviated as "PVA", and a water-soluble film including a polyvinyl alcohol resin as a main component is hereinafter sometimes abbreviated as "PVA water-soluble film" or simply as "water-soluble film".

BACKGROUND ART

A PVA film is a film formed of a PVA resin that has water solubility while being a thermoplastic resin, and the film is largely different from a hydrophobic film that is frequently used for a packaging film or the like in ordinary cases, such as a polyethylene terephthalate film or a polyolefin film, in, for example, various film physical properties and texture.

In addition, a chemical agent portion package (unit package) obtained by incorporating any one of various chemical agents, such as an agricultural chemical and a detergent, into a bag formed of a film of the PVA resin through the exploitation of the water solubility of the PVA resin has heretofore been proposed, and has been used in a wide variety of applications.

As a water-soluble unit packaging bag to be used in such applications, for example, there has been known a water-soluble film obtained by blending 100 parts by weight of a PVA with 5 parts by weight to 30 parts by weight of a plasticizer, 1 part by weight to 10 parts by weight of starch, and 0.01 parts by weight to 2 parts by weight of a surfactant (see, for example, PTL 1), or a water-soluble film formed of a resin composition containing 20 parts by weight to 50 parts by weight of a plasticizer, 2 parts by weight to 30 parts by weight of a filler, and 0.01 parts by weight to 2.5 parts by weight of a surfactant with respect to 100 parts by weight of an anionic group-modified PVA resin having a 4 wt. % aqueous solution viscosity at 20° C. of from 10 mPa·s to 35 mPa·s, an average saponification degree of from 80.0 mol % to 99.9 mol %, and an anionic group modification amount of from 1 mol % to 10 mol % (see, for example, PTL 2).

RELATED ART DOCUMENT

Patent Document

PTL 1: JP-A-2001-329130
PTL 2: JP-A-2004-161823

SUMMARY

Each of the water-soluble films disclosed in PTL 1 and PTL 2 described above is excellent in water solubility and hence can be used as a chemical agent package having packaged therein a liquid detergent or the like. Meanwhile, however, when such water-soluble films are bonded to each other by water sealing at the time of the production of the package through the packaging of a liquid, such as the liquid detergent, the adhesive property of a water-sealed portion is not sufficient, and hence concerns are raised about liquid leakage and the like. Accordingly, a further improvement of any such film has been required. In addition, when a required time from the end of water application to the water sealing is excessively short, the sealability is affected in some cases, and hence the films have been susceptible to improvement in terms of productivity.

In view of the foregoing, under such background, according to the present disclosure, there are provided a liquid chemical agent package that has not only water solubility but also high adhesiveness of a water-sealed portion and is hence excellent in sealability, and that is hardly affected by the lapse of a time period from the end of water application to water sealing and hence can maintain high sealability, and a method of producing the package.

To provide such liquid chemical agent package and production method, the inventor has made extensive investigations in view of such circumstances, and as a result, has found that when inorganic particles are caused to exist at an interface between the bonding surfaces of water-soluble films each containing a PVA resin as a main component at the time of the production of a liquid chemical agent package through the use of the water-soluble films, a liquid chemical agent package that has high adhesiveness of a water-sealed portion and is hence excellent in sealability, and that is hardly affected by the lapse of a time period from the end of water application to water sealing and hence can maintain high sealability can be obtained without the impairment of the water solubility of each of the water-soluble films.

That is, the gist of the present disclosure relates to a liquid chemical agent package, including: a package bag obtained by bonding water-soluble films each containing a PVA resin (A) to each other; and a liquid chemical agent included in the package bag, wherein in a section in a vertical direction relative to bonding surfaces of the water-soluble films, the liquid chemical agent package contains 20 or more inorganic particles each having a particle diameter of 2 μm or more in a range extending from an interface between the bonding surfaces by ±10 μm in the vertical direction and having a width of 900 μm.

Further, according to the present disclosure, there is also provided a method of producing the liquid chemical agent package.

The liquid chemical agent package of the present disclosure is a liquid chemical agent package, including: a package bag obtained by bonding water-soluble films each containing a PVA resin (A) to each other; and a liquid chemical agent included in the package bag, wherein in a section in a vertical direction relative to bonding surfaces of the water-soluble films, the liquid chemical agent package contains 20 or more inorganic particles each having a particle diameter of 2 μm or more in a sealed sectional portion having a range extending from an interface between the bonding surfaces by ±10 μm in the vertical direction and having a width of 900 μm. Accordingly, the package has high adhesiveness of a water-sealed portion and is hence excellent in sealability, and the package is hardly affected by the lapse of a time period from the end of water application to water sealing and hence can maintain high sealability.

In addition, when the PVA resin (A) contains an anionic group-modified PVA resin and an unmodified PVA, the sealability of the sealed portion becomes more excellent.

Further, when the water-soluble films each further contain a plasticizer (B), in the case where the films are turned into a liquid chemical agent package, the flexibility of each of the films becomes more excellent.

In addition, when the water-soluble films each have a water content of from 3 wt. % to 15 wt. %, the flexibility becomes even more excellent.

In addition, in the case where the liquid chemical agent shows a pH value of from 6 to 12 when dissolved or dispersed in water, and the liquid chemical agent has a water content of 15 wt. % or less, each of the water-soluble films does not gel or become insoluble, and is hence excellent in water solubility.

In addition, according to the method of producing a liquid chemical agent package having a liquid chemical agent included therein by bonding water-soluble films each containing a PVA resin (A) to each other, the production method including the step of applying inorganic particle-dispersed water ($\alpha$) containing 0.1 wt. % to 50 wt. % of inorganic particles having an average particle diameter of 2 μm or more to a bonding surface of at least one of the water-soluble films before the bonding of the water-soluble films, a water-sealed portion has high adhesiveness and is hence excellent in sealability. Accordingly, the liquid leakage of the liquid chemical agent can be prevented.

In addition, when the inorganic particle-dispersed water ($\alpha$) is applied to the bonding surface of the water-soluble film in an amount of from 0.5 g/cm$^2$ to 50 g/cm$^2$, the sealability becomes more excellent.

DESCRIPTION OF EMBODIMENTS

The construction of the present disclosure is described in detail below. However, the following description describes an example of a desired embodiment of the present disclosure, and the present disclosure is not limited to its contents.

In the present disclosure, the term "(meth)acryl" means acryl or methacryl, and the term "(meth)acrylate" means an acrylate or a methacrylate.

A liquid chemical agent package of the present disclosure is specifically described below.

Figure 2:
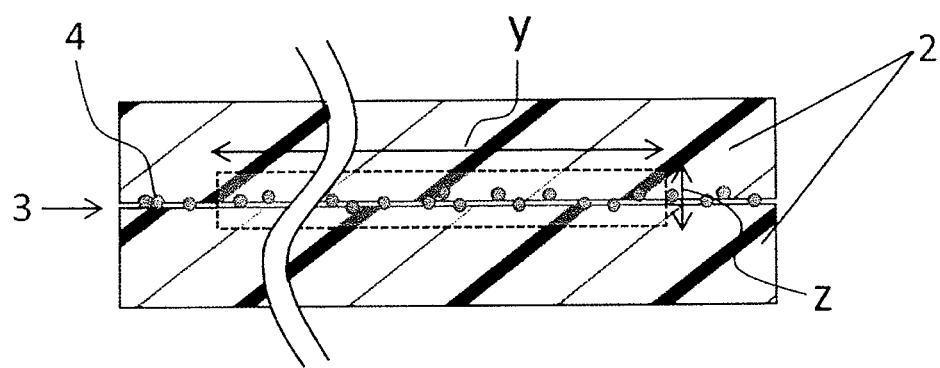
FIG. 2 is a schematic view for illustrating a sealed sectional portion in a liquid chemical agent package of the present disclosure. In the figure, inorganic particles 4 each having a particle diameter of 2 μm or more, which are present in a range (z) extending from an interface 3 between the bonding surfaces of water-soluble films 2 by a distance of ±10 μm in a vertical direction, are schematically illustrated as inorganic particles. Even a case in which inorganic particles each having a particle diameter of less than 2 μm are additionally present, or a case in which inorganic particles are present in a range outside the range (z) falls within the scope of the liquid chemical agent package of the present disclosure.

The liquid chemical agent package of the present disclosure includes: a package bag obtained by bonding water-soluble films each containing a PVA resin (A) to each other; and a liquid chemical agent included in the package bag, wherein, as illustrated in FIG. 2, in a section in a vertical direction relative to bonding surfaces of the water-soluble films 2, the liquid chemical agent package contains 20 or more inorganic particles 4 each having a particle diameter of 2 μm or more in a range extending from an interface 3 between the bonding surfaces by ±10 μm in the vertical direction (z) and having a width of 900 μm in a parallel direction to the interface 3 (y) (sealed sectional portion).

Here, the liquid chemical agent package of the present disclosure is obtained by water-sealing the water-soluble films at the time of the production of the package bag, and when inorganic particle-dispersed water having dispersed therein inorganic particles is used as water for the water sealing, the sealability of a water-sealed portion is dramatically improved. Accordingly, the inorganic particles in the inorganic particle-dispersed water used in the water sealing are present in the sealed sectional portion of the resultant liquid chemical agent package, and hence the number of the inorganic particles is specified in the present disclosure.

As described above, the liquid chemical agent package of the present disclosure contains 20 or more inorganic particles each having a particle diameter of 2 μm or more in the sealed sectional portion. In terms of an improvement in sealability, the package more preferably contains 30 or more inorganic particles, and particularly preferably contains 40 or more inorganic particles. The upper limit of the number of the inorganic particles each having a particle diameter of 2 μm or more is typically 400, preferably 300 or less, more preferably 200 or less.

The measurement of the number of the inorganic particles in the sealed sectional portion is performed as described below.

[Method of Measuring Number of Inorganic Particles in Sealed Sectional Portion]

Figure 1A:
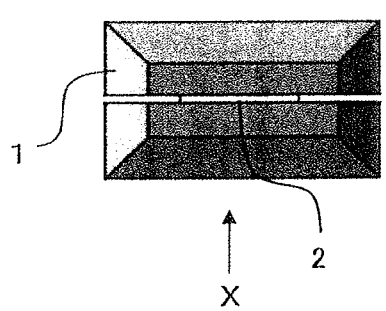
FIG. 1A and FIG. 1B are each a schematic view for illustrating a method of forming a sealed sectional portion in a method of measuring the number of inorganic particles in the sealed sectional portion, FIG. 1A being a plan view of a state in which water-soluble films are fixed by being sandwiched between jigs and FIG. 1B being a side view of the plan view of FIG. 1A when viewed from an X-direction.
Figure 1B:
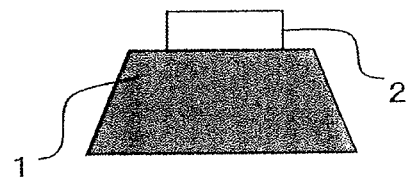

As illustrated in a plan view of FIG. 1A and a side view of FIG. 1B when the plan view of FIG. 1A is viewed from an X-direction, the water-sealed water-soluble films 2 are fixed by being sandwiched between jigs 1 from both sides. After that, a razor is slid in a horizontal direction above the jigs to cut the water-soluble films 2 protruding from the jigs 1. Thus, the sealed sectional portion of the water-soluble films 2 is formed. Then, the sealed sectional portion fixed with the jigs 1 illustrated in each of FIG. 1A and FIG. 1B is mounted on the stage of a digital microscope (manufactured by HIROX Co., Ltd., KH-8700), followed by the observation of the surface of the sealed sectional portion (uneven surface) with the digital microscope. The observation is performed in a field of view at a magnification on a 15-inch monitor of 1,000, and the number of the inorganic particles each having a particle diameter of 2 μm or more, which are present in the sealed sectional portion, is counted. The measurement operation is performed until a linear distance along a sealing interface reaches 900 μm.

In addition, the inorganic particles are not particularly limited, and examples thereof include: oxide inorganic compounds, such as silica (silicon dioxide), diatomaceous earth, titanium oxide, calcium oxide, magnesium oxide, aluminum oxide, barium oxide, germanium oxide, tin oxide, and zinc oxide; and talc, clay, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassium titanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Those inorganic particles may be used alone or in combination thereof.

Of those, an oxide inorganic compound or talc is preferably used in the present disclosure because the compound or talc is excellent in hydrogen bonding action with the PVA resin (A) and hence improves a water sealability-improving effect; titanium oxide, talc, or silica is more preferably used, and silica is particularly preferably used. An interaction between the molecules of silica present on the bonding surfaces of the water-soluble films is assumed to improve an adhesive force between the surfaces at the time of the water sealing.

Silica described above is, for example, amorphous synthetic silica, and examples thereof include (I) dry silica and fumed silica each obtained by a dry method (synthesized by burning silicon tetrachloride, oxygen, and hydrogen), and (II) precipitated silica, silica gel (porous silica), and colloidal silica synthesized by a sol-gel method each obtained by a wet method (synthesized by a wet process through the addition of a mineral acid to sodium silicate). In addition, a product obtained by modifying the surface of any such silica with a coupling agent or the like may be used.

In the present disclosure, porous silica excellent in water absorption-aiding action based on its porous structure and in reinforcing action with the PVA resin (A) is more preferably used in terms of an improvement in water sealability.

Inorganic particles having an average particle diameter of 2 μm or more are used as inorganic particles in inorganic particle-dispersed water (α) to be used at the time of the water sealing of the liquid chemical agent package of the present disclosure, and inorganic particles having an average particle diameter of 4 μm or more are more preferably used, and inorganic particles having an average particle diameter of 6 μm or more are particularly preferably used. The upper limit of the average particle diameter of the inorganic particles is 10 μm.

The average particle diameter can be measured with, for example, a laser diffraction-type particle size distribution-measuring apparatus.

An improvement in sealability can be confirmed by measuring a peel strength between the water-soluble films bonded to each other. In terms of the durability of the package bag, the peel strength between the water-soluble films is preferably 140 g/15 mm or more, more preferably 150 g/15 mm or more, particularly preferably 160 g/15 mm or more. When the peel strength between the water-soluble films is excessively low, liquid leakage may occur from an end surface after the packaging of the liquid chemical agent. The upper limit of the peel strength is typically 10,000 g/15 mm, preferably 5,000 g/15 mm, more preferably 2,000 g/15 mm.

<Water-Soluble Films>

The water-soluble films to be used in the present disclosure are each obtained by forming a resin composition typically containing the PVA resin (A) as a main component into a film. In the description of the water-soluble films, the PVA resin (A) incorporated into the resin composition serving as a film-forming material for the films is described first.

The term "main component" as used herein refers to a component accounting for more than half of the entirety of each of the films, and is meant to include a case in which the entirety is formed only of the main component. Of such cases, a case in which the PVA resin (A) is incorporated at 50 wt. % or more, in particular, 70 wt. % or more into the resin composition is more preferred.

<PVA Resin (A)>

Examples of the PVA resin (A) to be used in the present disclosure include an unmodified PVA and a modified PVA resin.

The average saponification degree of each of those PVA resins (A) is preferably 80 mol % or more, particularly preferably from 82 mol % to 99.9 mol %, more preferably from 85 mol % to 98.5 mol %, still more preferably from 90 mol % to 97 mol %. In addition, when an unmodified PVA is used as the PVA resin (A), its average saponification degree is preferably 80 mol % or more, particularly preferably from 82 mol % to 99 mol %, more preferably from 85 mol % to 90 mol %. In addition, when a modified PVA resin is used as the PVA resin (A), its average saponification degree is preferably 80 mol % or more, particularly preferably from 85 mol % to 99.9 mol %, more preferably from 90 mol % to 98 mol %. Further, when an anionic group-modified PVA resin is used as the PVA resin (A), its average saponification degree is preferably 85 mol % or more, particularly preferably from 88 mol % to 99 mol %, more preferably from 90 mol % to 97 mol %. When such average saponification degree is excessively small, the solubility of each of the water-soluble films in water tends to reduce with time depending on the pH of the liquid chemical agent to be packaged. When the average saponification degree is excessively large, the solubility in water tends to be largely reduced owing to thermal history at the time of film formation.

The polymerization degree of the PVA resin (A) may be generally represented by an aqueous solution viscosity, and its 4 wt. % aqueous solution viscosity at 20° C. is preferably from 5 mPa·s to 50 mPa·s, particularly preferably from 13 mPa·s to 45 mPa·s, more preferably from 17 mPa·s to 40 mPa·s. In addition, when an unmodified PVA is used as the PVA resin (A), the 4 wt. % aqueous solution viscosity of the unmodified PVA at 20° C. is preferably from 5 mPa·s to 50 mPa·s, particularly preferably from 13 mPa·s to 45 mPa·s, more preferably from 17 mPa·s to 40 mPa·s. In addition, when a modified PVA resin is used as the PVA resin (A), the 4 wt. % aqueous solution viscosity of the modified PVA resin at 20° C. is preferably from 5 mPa·s to 50 mPa·s, particularly preferably from 13 mPa·s to 40 mPa·s, more preferably from 17 mPa·s to 30 mPa·s. When such viscosity is excessively small, the mechanical strength of each of the water-soluble films serving as a packaging material tends to be reduced. Meanwhile, when the viscosity is excessively large, the aqueous solution viscosity of the resin at the time of film formation is high, and hence the productivity of the films tends to be reduced.

The average saponification degree is measured in conformity with JIS K 6726 3.5, and the 4 wt. % aqueous solution viscosity is measured in conformity with JIS K 6726 3.11.2.

Examples of the modified PVA resin to be used in the present disclosure include an anionic group-modified PVA resin, a cationic group-modified PVA resin, and a nonionic group-modified PVA resin. Of those, the anionic group-modified PVA resin is preferably used in terms of the solubility of each of the water-soluble films in water. Examples of the kind of the anionic group include a carboxyl group, a sulfonic acid group, and a phosphoric acid group. Of those, the carboxyl group or the sulfonic acid group is preferred in terms of the chemical resistance of each of the films and the stability thereof with time, and a carboxyl group is particularly preferred.

The modification amount of the anionic group-modified PVA resin is preferably from 1 mol % to 10 mol %, particularly preferably from 2 mol % to 9 mol %, more preferably from 2 mol % to 8 mol %, still more preferably from 3 mol % to 7 mol %. When such modification amount is excessively small, the solubility of the resin in water tends to be reduced. When the modification amount is excessively large, the productivity of the PVA resin (A) tends to be reduced, or the biodegradability thereof tends to be reduced. In addition, the blocking of the water-soluble films is also liable to occur.

In the present disclosure, the PVA resins (A) may be used alone. In addition, the unmodified PVAs may be used in combination, the modified PVA resins may be used in combination, or the unmodified PVA and the modified PVA resin may be used in combination. Further, for example, two or more kinds of PVA resins different from each other in saponification degree, viscosity, modifying group, modification amount, or the like may be used in combination.

In the present disclosure, the PVA resin (A) preferably contains the modified PVA resin out of those resins because its solubility can be held for a long time period, and the resin more preferably contains the anionic group-modified PVA resin and particularly preferably contains a carboxyl group-modified PVA resin. Further, the resin preferably contains the anionic group-modified PVA resin and the unmodified PVA in terms of a film strength and because the adhesiveness of the water-sealed portion is excellent, and the resin particularly preferably contains an anionic group-modified PVA resin (A1), and an unmodified PVA (A2) and an unmodified PVA (A3) different from each other in viscosity.

The content weight ratio (modified PVA resin/unmodified PVA) of the modified PVA resin to the unmodified PVA is preferably from 95/5 to 60/40, particularly preferably from 94/6 to 70/30, more preferably from 93/7 to 80/20. When such content weight ratio is excessively small, the solubility of each of the water-soluble films in water tends to be reduced, and when the ratio is excessively large, the sealability thereof tends to be reduced.

In addition, when the modified PVA resin and the unmodified PVA are used in combination, the 4 wt. % aqueous solution viscosity of the unmodified PVA particularly at 20° C. is preferably from 5 mPa·s to 50 mPa·s, particularly preferably from 8 mPa·s to 45 mPa·s, more preferably from 12 mPa·s to 40 mPa·s, still more preferably from 15 mPa·s to 35 mPa·s. When such viscosity is excessively small, the mechanical strength of each of the water-soluble films serving as a packaging material tends to be reduced. Meanwhile, when the viscosity is excessively large, the aqueous solution viscosity of the resin at the time of film formation is high, and hence the productivity of the films tends to be reduced.

Further, when the anionic group-modified PVA resin (A1), and the unmodified PVA (A2) and the unmodified PVA (A3) different from each other in viscosity are used in combination, in ordinary cases, the 4 wt. % aqueous solution viscosity of the unmodified PVA (A2) at 20° C. is preferably from 21 mPa·s to 80 mPa·s, particularly preferably from 25 mPa·s to 70 mPa·s, more preferably from 30 mPa·s to 60 mPa·s, still more preferably from 35 mPa·s to 50 mPa·s. Meanwhile, in ordinary cases, the 4 wt. % aqueous solution viscosity of the unmodified PVA (A3) at 20° C. is preferably from 1 mPa·s to 20 mPa·s, particularly preferably from 2 mPa·s to 18 mPa·s, more preferably from 3 mPa·s to 15 mPa·s, still more preferably from 4 mPa·s to 13 mPa·s. When any such viscosity is excessively small, a sealing strength at the time of the water sealing tends to be reduced or the mechanical strength of each of the films tends to be reduced. When the viscosity is excessively large, the aqueous solution viscosity of the resin at the time of film formation is high, and hence the productivity of the films tends to be reduced.

The average saponification degree of each of the unmodified PVA (A2) and the unmodified PVA (A3) is typically 80 mol % or more, preferably from 82 mol % to 99 mol %, particularly preferably from 85 mol % to 90 mol %. When such average saponification degree is excessively small, the solubility of each of the water-soluble films in water tends to reduce with time depending on the pH of the chemical agent to be packaged. When the average saponification degree is excessively large, the solubility in water tends to be largely reduced owing to thermal history at the time of film formation.

In addition, when the anionic group-modified PVA resin (A1), and the unmodified PVA (A2) and the unmodified PVA (A3) different from each other in viscosity are used in combination, the PVA resin (A) preferably contains the unmodified PVA (A2) and the unmodified PVA (A3) while containing the anionic group-modified PVA resin (A1) as a main component. The term "main component" as used herein refers to a component accounting for more than half of the entirety of the PVA resin (A), and the content of the anionic group-modified PVA resin (A1) in the PVA resin (A) is more preferably 70 wt. % or more, more preferably 80 wt. % or more.

The content of the unmodified PVA (A2) in the PVA resin (A) is preferably from 1 part by weight to 20 parts by weight, particularly preferably from 3 parts by weight to 15 parts by weight, more preferably from 5 parts by weight to 13 parts by weight, still more preferably from 6 parts by weight to 10 parts by weight with respect to 100 parts by weight of the anionic group-modified PVA resin (A1). In addition, the content of the unmodified PVA (A3) in the PVA resin (A) is preferably from 0.5 parts by weight to 10 parts by weight, particularly preferably from 1 part by weight to 7 parts by weight, more preferably from 1.5 parts by weight to 5 parts by weight, still more preferably from 2 parts by weight to 4 parts by weight with respect to 100 parts by weight of the anionic group-modified PVA resin (A1). When any such content is excessively small, the water sealing strength of the water-sealed portion tends to be reduced, and when the content is excessively large, the water solubility of each of the water-soluble films tends to be reduced.

In addition, the content ratio (A2/A3) of the unmodified PVA (A2) to the unmodified PVA (A3) is typically from 1/9 to 9/1, preferably from 5/5 to 9/1, particularly preferably from 6/4 to 8/2 in terms of weight ratio. When the content ratio of the unmodified PVA (A2) to the unmodified PVA (A3) is excessively small, the water sealing strength tends to be reduced or the mechanical strength of each of the water-soluble films tends to be reduced. When the content ratio is excessively large, the water solubility tends to be reduced.

Further, when the anionic group-modified PVA resin (A1), and the unmodified PVA (A2) and the unmodified PVA (A3) different from each other in viscosity are used in combination, a resin except the anionic group-modified PVA resin (A1), the unmodified PVA (A2), and the unmodified PVA (A3), for example, a PVA resin different from the resins in saponification degree, viscosity, modifying group, modification amount, or the like may be incorporated into the PVA resin (A) to the extent that the effects of the present disclosure are not impaired.

The PVA resin (A) is produced, for example, as described below.

Examples of the PVA resin (A) include an unmodified PVA and a modified PVA resin. The unmodified PVA may be produced by saponifying a vinyl ester polymer obtained by polymerizing a vinyl ester compound.

Examples of such vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of those, vinyl acetate is preferably used. The vinyl ester compounds may be used alone or in combination thereof.

The modified PVA resin may be produced by, for example, a method involving copolymerizing the vinyl ester compound and an unsaturated monomer having a modifying group copolymerizable with the vinyl ester compound, and then saponifying the resultant copolymer, or a method involving post-modifying the unmodified PVA.

In the present disclosure, any one of the following unsaturated monomers copolymerizable with the vinyl ester compound may be copolymerized, but when the modified PVA resin is to be obtained, an unsaturated monomer having a modifying group out of the following unsaturated monomers needs to be copolymerized. Examples of the unsaturated monomer include: olefins, such as ethylene, propylene, isobutylene, α-octene, α-dodecene, and α-octadecene; hydroxy group-containing α-olefins, such as 3-buten-1-ol, 4-penten-1-ol, and 5-hexen-1-ol, and derivatives thereof, such as acylated products thereof; unsaturated acids, such as acrylic acid, methacrylic acid, crotonic acid, maleic acid, maleic anhydride, itaconic acid, and undecylenic acid, and salts, monoesters, or dialkyl esters thereof; amides, such as diacetone acrylamide, acrylamide, and methacrylamide; and olefin sulfonic acids, such as ethylenesulfonic acid, allylsulfonic acid, and methallylsulfonic acid, and salts thereof. Those unsaturated monomers may be used alone or in combination thereof. The content ratio of the copolymerizable unsaturated monomer is typically 10 mol % or less with respect to the total of the vinyl ester compound and the copolymerizable unsaturated monomer.

In addition, the modified PVA resin is, for example, a resin having a primary hydroxy group in a side chain thereof in which, for example, the number of primary hydroxy groups in the side chain is typically from 1 to 5, preferably 1 or 2, particularly preferably 1, and the resin preferably further has a secondary hydroxy group in addition to the primary hydroxy group. Examples of such modified PVA resin include a PVA resin having a hydroxyalkyl group in a side chain thereof and a PVA resin having a 1,2-diol structural unit in a side chain thereof. The PVA resin having a 1,2-diol structural unit in a side chain thereof may be produced by, for example: (i) a method involving saponifying a copolymer of vinyl acetate and 3,4-diacetoxy-1-butene; (ii) a method involving saponifying and decarboxylating a copolymer of vinyl acetate and vinyl ethylene carbonate; (iii) a method involving saponifying and deketalizing a copolymer of vinyl acetate and a 2,2-dialkyl-4-vinyl-1,3-dioxolane; or (iv) a method involving saponifying a copolymer of vinyl acetate and glycerin monoallyl ether.

A known polymerization method, such as a solution polymerization method, an emulsion polymerization method, or a suspension polymerization method, may be arbitrarily used as a polymerization method in the production of the PVA resin (A). However, the production is typically performed by a solution polymerization method involving using a lower alcohol, such as methanol, ethanol, or isopropyl alcohol, as a solvent. In the case of the modified PVA resin, such arbitrary methods as described below may each be used as a method of loading monomers in such solution polymerization method: a method involving loading the total amount of the vinyl ester compound and part of, for example, the unsaturated monomer having a carboxyl group first, initiating their polymerization, and adding the remaining unsaturated monomer in a continuous or divided manner during the period of the polymerization; and a method involving loading the unsaturated monomer having a carboxyl group in a lump.

Known polymerization catalysts, such as azo catalysts including azobisisobutyronitrile, and peroxide catalysts including acetyl peroxide, benzoyl peroxide, and lauroyl peroxide, may each be appropriately selected and blended in accordance with the polymerization method. In addition, the reaction temperature of the polymerization is selected from the range of from 50° C. to about the boiling point of the selected polymerization catalyst.

The saponification is performed in the presence of a saponification catalyst by dissolving the resultant copolymer in an alcohol. Examples of the alcohol include alcohols each having 1 to 5 carbon atoms, such as methanol, ethanol, and butanol. Those alcohols may be used alone or in combination thereof. In addition, the concentration of the copolymer in the alcohol is selected from the range of from 20 wt. % to 50 wt. %.

For example, alkali catalysts, such as hydroxides and alcoholates of alkali metals including sodium hydroxide, potassium hydroxide, sodium methylate, sodium ethylate, and potassium methylate, may each be used as the saponification catalyst, and an acid catalyst may also be used. The usage amount of the saponification catalyst is preferably set to from 1 millimole equivalent to 100 millimole equivalents with respect to the vinyl ester compound. Those saponification catalysts may be used alone or in combination thereof.

In the present disclosure, a carboxyl group-modified PVA resin is preferably used as the PVA resin (A), and the carboxyl group-modified PVA resin serving as a preferred modified species is described below.

The carboxyl group-modified PVA resin may be produced by an arbitrary method, and examples thereof include: (I) a method involving copolymerizing an unsaturated monomer having a carboxyl group and a vinyl ester compound, and then saponifying the resultant copolymer; and (II) a method involving polymerizing the vinyl ester compound while causing, for example, an alcohol, aldehyde, or thiol having a carboxyl group to coexist as a chain transfer agent, and then saponifying the resultant polymer.

The compounds described in the foregoing may each be used as the vinyl ester compound in the method (I) or (II). Of those, vinyl acetate is preferably used.

Examples of the unsaturated monomer having a carboxyl group in the method (I) include monomers, such as ethylenically unsaturated dicarboxylic acids (e.g., maleic acid, fumaric acid, and itaconic acid), ethylenically unsaturated dicarboxylic acid monoesters (e.g., maleic acid monoalkyl ester, fumaric acid monoalkyl ester, and itaconic acid monoalkyl ester), ethylenically unsaturated dicarboxylic acid diesters (e.g., maleic acid dialkyl ester, fumaric acid dialkyl ester, and itaconic acid dialkyl ester), provided that those diesters are each required to be transformed into a carboxyl group by hydrolysis at the time of saponification of the copolymer, ethylenically unsaturated carboxylic acid anhydrides (e.g., maleic anhydride and itaconic anhydride), and ethylenically unsaturated monocarboxylic acids (e.g., (meth)acrylic acid and crotonic acid), and salts thereof. Of those, maleic acid, the maleic acid monoalkyl ester, the maleic acid dialkyl ester, the maleic acid salt, maleic anhydride, itaconic acid, the itaconic acid monoalkyl ester, the itaconic acid dialkyl ester, (meth)acrylic acid, and the like are preferably used, maleic acid, the maleic acid monoalkyl ester, the maleic acid dialkyl ester, the maleic acid salt, and maleic anhydride are particularly preferably used, and the maleic acid monoalkyl ester is more preferably used. Those monomers may be used alone or in combination thereof.

In the method (II), a compound derived from a thiol, the compound having a particularly large chain transfer effect, is effective, and examples thereof include compounds represented by the following general formulae (1) to (3).

In the general formula (1), "n" represents an integer of from 0 to 5.

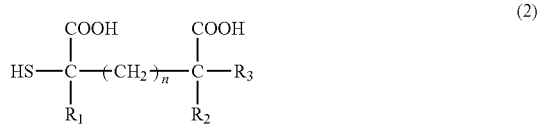

In the general formula (2), "n" represents an integer of from 0 to 5, and $R_1$, $R_2$, and $R_3$ each represent a hydrogen atom or a lower alkyl group (that may contain a substituent).

In the general formula (3), "n" represents an integer of from 0 to 20.

The examples also include salts of the compounds represented by the general formulae (1) to (3). Specific examples thereof include a mercaptoacetic acid salt, a 2-mercaptopropionic acid salt, a 3-mercaptopropionic acid salt, and a 2-mercaptostearic acid salt. Those compounds may be used alone or in combination thereof.

A method of producing the carboxyl group-modified PVA resin is not limited to the above-mentioned methods, and for example, a post-modification method involving causing a carboxyl group-containing compound having a functional group having reactivity with a hydroxy group, such as a dicarboxylic acid, an aldehyde carboxylic acid, or a hydroxycarboxylic acid, to post-react with a PVA resin (a partially saponified product or a completely saponified product) may also be performed.

In addition, when a sulfonic acid-modified PVA resin, which is modified with a sulfonic acid group, is used, the sulfonic acid-modified PVA resin may be produced by, for example, a method involving copolymerizing a copolymerizable component of, for example, vinylsulfonic acid, styrenesulfonic acid, allylsulfonic acid, methallylsulfonic acid, or 2-acrylamido-2-methylpropanesulfonic acid, and a vinyl ester compound, and then saponifying the resultant copolymer, or a method involving subjecting, for example, vinylsulfonic acid or a salt thereof, or 2-acrylamido-2-methylpropanesulfonic acid or a salt thereof to Michael addition to a PVA resin.

Meanwhile, an example of the method involving post-modifying the unmodified PVA is a method involving subjecting the unmodified PVA to acetoacetic acid esterification, acetalization, urethanation, etherification, grafting, phosphoric acid esterification, or oxyalkylenation.

The polymerization may be performed by incorporating any other general monomer in addition to the unsaturated monomer having a carboxyl group and the vinyl ester compound to the extent that the water solubility of the resin to be obtained is not impaired, and for example, an alkyl ester of an ethylenically unsaturated carboxylic acid, an allyl ester of a saturated carboxylic acid, an α-olefin, an alkyl vinyl ether, an alkyl allyl ether, (meth)acrylamide, (meth)acrylonitrile, styrene, and vinyl chloride may each be used as such monomer. Those monomers may be used alone or in combination thereof.

Thus, the PVA resin (A) is obtained. However, the resin composition serving as a film-forming material preferably contains a plasticizer (B) in addition to the PVA resin (A), and may further contain a filler (C), a surfactant (D), and any other component as required.

<Plasticizer (B)>

In the present disclosure, the plasticizer (B) is preferably incorporated into the resin composition serving as a film-forming material in addition to the PVA resin (A) in terms of the impartment of flexibility to each of the water-soluble films when the films are turned into a liquid chemical agent package. Although the plasticizers (B) may be used alone or in combination thereof, two or more kinds of the plasticizers (B) are preferably used in combination in terms of the toughness of each of the water-soluble films themselves when turned into the package.

When two or more kinds of such plasticizers (B) are used in combination, the following two kinds of plasticizers are preferably used in terms of toughness at the time of the formation of each of the water-soluble films or at the time of the production of the package bag, and shape stability with time when the films are turned into a package bag for a liquid chemical agent: a polyhydric alcohol (b1) having a melting point of 80° C. or more (hereinafter sometimes abbreviated as "plasticizer (b1)") and a polyhydric alcohol (b2) having a melting point of 50° C. or less (hereinafter sometimes abbreviated as "plasticizer (b2)").

As the polyhydric alcohol (b1) having a melting point of 80° C. or more, that is, the plasticizer (b1), most of sugar alcohols, monosaccharides, and polysaccharides are applicable. Examples of the plasticizer (b1) include: dihydric alcohols, such as salicyl alcohol (83° C.), catechol (105° C.), resorcinol (110° C.), hydroquinone (172° C.), bisphenol A (158° C.), bisphenol F (162° C.), and neopentyl glycol (127° C.); trihydric alcohols, such as phloroglucinol (218° C.); tetrahydric alcohols, such as erythritol (121° C.), threitol (88° C.), and pentaerythritol (260° C.); pentahydric alcohols, such as xylitol (92° C.), arabitol (103° C.), fucitol (153° C.), glucose (146° C.), and fructose (104° C.); hexahydric alcohols, such as mannitol (166° C.), sorbitol (95° C.), and inositol (225° C.); octahydric alcohols, such as lactitol (146° C.), sucrose (186° C.), and trehalose (97° C.); and nonahydric or higher alcohols, such as maltitol (145° C.). Those plasticizers (b1) may be used alone or in combination thereof. The melting point of each compound is shown in the parentheses.

Of those plasticizers (b1) described above, in terms of the tensile strength of each of the water-soluble films, a plasticizer having a melting point of 85° C. or more, in particular, 90° C. or more is preferred. The upper limit of the melting point is typically 300° C., and is particularly preferably 200° C.

Further, in the present disclosure, the number of hydroxy groups in a molecule of the plasticizer (b1) is preferably 4 or more in terms of compatibility with the PVA resin (A), and is particularly preferably from 5 to 10, more preferably from 6 to 8. Suitable specific examples of the plasticizer satisfying such condition include sorbitol, sucrose, and trehalose.

In addition, in the present disclosure, the molecular weight of the plasticizer (b1) is preferably 150 or more in terms of the toughness of each of the water-soluble films, and is particularly preferably from 160 to 500, more preferably from 180 to 400. Suitable specific examples of the plasticizer satisfying such condition include sorbitol and sucrose.

Meanwhile, as the polyhydric alcohol (b2) having a melting point of 50° C. or less, that is, the plasticizer (b2), most of aliphatic alcohols are applicable. Preferred examples of the plasticizer (b2) include: dihydric alcohols, such as ethylene glycol (−13° C.), diethylene glycol (−11° C.), triethylene glycol (−7° C.), propylene glycol (−59° C.), tetraethylene glycol (−5.6° C.), 1,3-propanediol (−27° C.), 1,4-butanediol (20° C.), 1,6-hexanediol (40° C.), tripropylene glycol, and polyethylene glycol having a molecular weight of 2,000 or less; and trihydric or higher alcohols, such as glycerin (18° C.), diglycerin, and triethanolamine (21° C.) In addition, the melting point is preferably 30° C. or less in terms of the flexibility of each of the water-soluble films, and is particularly preferably 20° C. or less. The lower limit of the melting point is typically −80° C., preferably −10° C., particularly preferably 0° C. Those plasticizers may be used alone or in combination thereof. The melting point of each compound is shown in the parentheses.

Further, in the present disclosure, the number of hydroxy groups in a molecule of the plasticizer (b2) is preferably 4 or less, and is particularly preferably 3 or less because the control of the flexibility near room temperature (25° C.) is facilitated. Specifically, glycerin is suitable as the plasticizer satisfying such condition.

In addition, in the present disclosure, the molecular weight of the plasticizer (b2) is preferably 100 or less because the control of the flexibility is facilitated, and is particularly preferably from 50 to 100, more preferably from 60 to 95. Specifically, glycerin is suitable as the plasticizer satisfying such condition.

In the present disclosure, a plasticizer (b3) except the plasticizer (b1) or (b2) may also be used in combination to the extent that the effects of the present disclosure are not impaired. Examples of such plasticizer (b3) include: alcohols, such as trimethylolpropane (58° C.), diethylene glycol monomethyl ether, cyclohexanol, carbitol, and polypropylene glycol; ethers, such as dibutyl ether; carboxylic acids, such as stearic acid, oleic acid, linoleic acid, linolenic acid, sorbic acid, citric acid, and adipic acid; ketones, such as cyclohexanone; amines, such as monoethanolamine, triethanolamine, ethylenediamine, and an imidazole compound; and amino acids, such as alanine, glycine, aspartic acid, glutamic acid, histidine, lysine, and cysteine. Those plasticizers may be used alone or in combination thereof.

In the present disclosure, the content of the plasticizer (B) is preferably 20 parts by weight or more, particularly preferably from 25 parts by weight to 70 parts by weight, more preferably from 30 parts by weight to 60 parts by weight, still more preferably from 35 parts by weight to 50 parts by weight with respect to 100 parts by weight of the PVA resin (A). When such content of the plasticizer (B) is excessively small, in the case where a package is provided by packaging a liquid, such as a liquid chemical agent, with the water-soluble films, the toughness of each of the water-soluble films tends to be impaired with time. When the content is excessively large, the mechanical strength of each of the films tends to be reduced.

In addition, with regard to the plasticizer (b1) and the plasticizer (b2), the content weight ratio (b1/b2) of the plasticizer (b1) to the plasticizer (b2) is preferably from 0.1 to 5, particularly preferably from 0.35 to 4.5, more preferably from 0.4 to 4, still more preferably from 0.5 to 3.5, most preferably from 0.7 to 3. When the content weight ratio is excessively small, the water-soluble films tend to be excessively soft, and hence the sealing strength at low temperature tends to be reduced and the blocking of the films is liable to occur. When the content weight ratio is excessively large, the water-soluble films tend to be excessively hard, and hence tend to be brittle under a low-humidity environment.

In addition, with regard to the contents of the plasticizer (b1) and the plasticizer (b2), the content of the plasticizer (b1) is preferably from 5 parts by weight to 40 parts by weight, particularly preferably from 8 parts by weight to 30 parts by weight, more preferably from 10 parts by weight to 25 parts by weight with respect to 100 parts by weight of the PVA resin (A), and the content of the plasticizer (b2) is preferably from 5 parts by weight to 40 parts by weight, particularly preferably from 10 parts by weight to 35 parts by weight, more preferably from 15 parts by weight to 30 parts by weight with respect thereto.

When the content of such plasticizer (b1) is excessively small, the water-soluble films tend to be so soft that their blocking is liable to occur, and when the content is excessively large, the water-soluble films tend to be so hard as to be brittle under a low-humidity environment. In addition, when the content of the plasticizer (b2) is excessively small, the water-soluble films tend to be excessively hard, and hence tend to be brittle under a low-humidity environment, and when the content is excessively large, the water-soluble films tend to be so soft that their blocking is liable to occur.

Further, the total amount of the plasticizer (b1) and the plasticizer (b2) is preferably 70 wt. % or more, more preferably 80 wt. % or more, particularly preferably 87 wt. % or more, still more preferably 90 wt. % or more, still further more preferably 95 wt. % or more with respect to the entirety of the plasticizers (B), and a case in which the entirety of the plasticizers (B) is formed only of the plasticizer (b1) and the plasticizer (b2) is most preferred. When the total amount of such plasticizers (b1) and (b2) is excessively small, the mechanical strength of each of the water-soluble films tends to be reduced.

<Filler (C)>

In the present disclosure, the filler (C) is preferably incorporated into the resin composition serving as a film-forming material in terms of the blocking resistance of each of the water-soluble films. Specific examples of such filler (C) include an inorganic filler and an organic filler. Of those, the organic filler is preferred. In addition, the average particle diameter of the filler is preferably from 0.1 μm to 50 μm, particularly preferably from 0.5 μm to 40 μm. The average particle diameter can be measured with, for example, a laser diffraction-type particle size distribution-measuring apparatus.

The average particle diameter of the inorganic filler is preferably from 1 μm to 10 μm. When such average particle diameter is excessively small, the effect of the dispersibility of each of the water-soluble films in water tends to be small. When the average particle diameter is excessively large, at the time of the stretching of each of the water-soluble films in its forming processing, a pinhole tends to occur or its appearance tends to be poor.

Specific examples of the inorganic filler include talc, clay, silicon dioxide (silica), diatomaceous earth, kaolin, mica, asbestos, gypsum, graphite, glass balloons, glass beads, calcium sulfate, barium sulfate, ammonium sulfate, calcium sulfite, calcium carbonate, calcium carbonate whisker, magnesium carbonate, dawsonite, dolomite, potassiumtitanate, carbon black, glass fibers, alumina fibers, boron fibers, processed mineral fibers, carbon fibers, hollow carbon spheres, bentonite, montmorillonite, copper powder, sodium sulfate, potassium sulfate, zinc sulfate, copper sulfate, iron sulfate, magnesium sulfate, aluminum sulfate, aluminum potassium sulfate, ammonium nitrate, sodium nitrate, potassium nitrate, aluminum nitrate, ammonium chloride, sodium chloride, potassium chloride, magnesium chloride, calcium chloride, sodium phosphate, and potassium chromate. Of those, silica is preferred. Those inorganic fillers may be used alone or in combination thereof.

When the inorganic filler is used, the filler may be identical to or different from the inorganic particles to be used in the inorganic particle-dispersed water (α) for water sealing, but is preferably identical thereto, and silica is suitably used.

The average particle diameter of the organic filler is preferably from 0.5 μm to 50 μm, particularly preferably from 1 μm to 40 μm, more preferably from 2 μm to 30 μm, still more preferably from 3 μm to 25 μm. When such average particle diameter is excessively small, cost for the formation of the water-soluble films tends to be increased. When the average particle diameter is excessively large, at the time of the stretching of each of the water-soluble films in its forming processing, a pinhole tends to occur.

Examples of such organic filler include biodegradable resins, such as starch, a melamine resin, a polymethyl (meth)acrylate resin, a polystyrene resin, and a polylactic acid. A biodegradable resin, such as a polymethyl (meth) acrylate resin, a polystyrene resin, or starch, is particularly suitably used as the organic filler. Those fillers may be used alone or in combination thereof.

Examples of the starch include raw starches (e.g., corn starch, potato starch, sweet potato starch, wheat starch, cassava starch, sago starch, tapioca starch, sorghum starch, rice starch, legume starch, pueraria starch, bracken starch, *Nelumbo nucifera* starch, and water chestnut starch), physically modified starches (e.g., α-starch, fractionated amylose, and heat-moisture-treated starch), enzymatically modified starches (e.g., hydrolyzed dextrin, enzyme-decomposed dextrin, and amylose), chemically degraded starches (e.g., acid-treated starch, hypochlorous acid-oxidized starch, and dialdehyde starch), and chemically modified starch derivatives (e.g., esterified starch, etherified starch, cationized starch, and cross-linked starch). Of those, the raw starches, in particular, the corn starch or the rice starch is preferably used in terms of ease of availability and economical efficiency. Those starches may be used alone or in combination thereof.

The content of the filler (C) is preferably from 1 part by weight to 30 parts by weight, particularly preferably from 2 parts by weight to 25 parts by weight, more preferably from 2.5 parts by weight to 20 parts by weight with respect to 100 parts by weight of the PVA resin (A). When such content is excessively small, the blocking resistance of each of the water-soluble films tends to be reduced. When the content is excessively large, at the time of the stretching of each of the water-soluble films in its forming processing, a pinhole tends to occur.

<Surfactant (D)>

The surfactant (D) is preferably incorporated into the resin composition serving as a film-forming material for the purpose of improving peelability from a cast surface at the time of the formation of each of the water-soluble films.

Typical examples of the surfactant (D) include a nonionic surfactant, a cationic surfactant, and an anionic surfactant. Examples of the nonionic surfactant include polyoxyethylene nonyl phenyl ether, polyoxyethylene octyl nonyl ether, polyoxyethylene dodecyl phenyl ether, polyoxyethylene alkyl allyl ethers, polyoxyethylene sorbitan monolaurate, polyoxyethylene sorbitan monopalmitate, polyoxyethylene sorbitan monostearate, polyoxyethylene sorbitan monooleate, polyoxyalkylene alkyl ether phosphate monoethanolamine salts, and polyoxyethylene alkylamino ethers, such as polyoxyethylene laurylamino ether and polyoxyethylene stearylamino ether. Of those, the polyoxyalkylene alkyl ether phosphate monoethanolamine salts and polyoxyethylene laurylamino ether are suitable in terms of production stability. Those nonionic surfactants may be used alone or in combination thereof.

The content of such surfactant (D) is preferably from 0.01 parts by weight to 3 parts by weight, particularly preferably from 0.1 parts by weight to 2.5 parts by weight, more preferably from 0.5 parts by weight to 2 parts by weight with respect to 100 parts by weight of the PVA resin (A). When such content is excessively small, peelability between the cast surface of a film-forming apparatus and each of the formed water-soluble films tends to be reduced, causing a reduction in productivity of the film. When the content is excessively large, an inconvenience, such as a reduction in adhesive strength at the time of sealing to be performed in the case where the water-soluble films are formed into a package, tends to occur.

In the present disclosure, for example, another water-soluble polymer (e.g., sodium polyacrylate, polyethylene oxide, polyvinylpyrrolidone, dextrin, chitosan, chitin, methyl cellulose, or hydroxyethyl cellulose), a perfume, a rust inhibitor, a colorant, an extender, an antifoaming agent, a UV absorber, liquid paraffins, a fluorescent whitening agent, or a bitter component (e.g., denatonium benzoate) may be further included to the extent that the object of the present disclosure is not inhibited. Those components may be used alone or in combination thereof.

In addition, in the present disclosure, an antioxidant is preferably blended in terms of the suppression of yellowing. Examples of such antioxidant include: sulfurous acid salts, such as sodium sulfite, potassium sulfite, calcium sulfite, and ammonium sulfite; tartaric acid; ascorbic acid; sodium thiosulfate; catechol; and Rongalite. Of those, the sulfurous acid salts are preferred, and sodium sulfite is particularly preferred. Those antioxidants may be used alone or in combination thereof. The blending amount of such antioxidant is preferably from 0.1 parts by weight to 10 parts by weight, particularly preferably from 0.2 parts by weight to 5 parts by weight, more preferably from 0.3 parts by weight to 3 parts by weight with respect to 100 parts by weight of the PVA resin (A).

The water-soluble films to be used in the present disclosure may each be obtained, for example, as described below. That is, a resin composition containing the PVA resin (A)

and the plasticizer (B), and, as required, the filler (C), the surfactant (D), and the like is dissolved or dispersed in water to provide a film-forming raw material. Then, the film-forming raw material is formed into a film to provide the target water-soluble film. A method, such as a melt extrusion method or a casting method, may be adopted as a method for such film formation, and the casting method is preferred in terms of the accuracy of the thickness of the film.

The film formation based on the casting method is performed, for example, as described below. First, water is added to the PVA resin (A) (powder) to prepare a PVA resin aqueous solution, and the plasticizer (B) and, as required, a substance to be blended, such as the filler (C) or the surfactant (D), are added to the aqueous solution to provide an aqueous dispersion or aqueous solution of the resin composition. Alternatively, water is added to the resin composition containing the PVA resin (A) and the plasticizer (B), and various substances to be blended to provide the aqueous dispersion or aqueous solution of the resin composition.

The solid content concentration of such aqueous dispersion or aqueous solution of the resin composition is preferably from 10 wt. % to 50 wt. %, particularly preferably 15 wt. % to 40 wt. %, more preferably from 20 wt. % to 35 wt. %. When such concentration is excessively low, the productivity of the water-soluble film tends to be reduced, and when the concentration is excessively high, the viscosity of the aqueous dispersion or the aqueous solution tends to be so high that the degassing of dope requires time or a die line occurs at the time of the formation of the water-soluble film. Further, when the temperature of the metal surface of an endless belt or a drum roll is excessively low, the drying of the aqueous dispersion or the aqueous solution tends to require time, and when the temperature is excessively high, foaming tends to occur in the aqueous dispersion or the aqueous solution at the time of the film formation.

Normal-temperature dissolution, high-temperature dissolution, pressure dissolution, or the like is typically adopted as a method of dissolving the resin composition. Of those, the high-temperature dissolution and the pressure dissolution are preferred because each of the methods produces a small amount of undissolved matter and is hence excellent in productivity. A dissolution temperature is typically from 80° C. to 100° C., preferably from 90° C. to 100° C. in the case of the high-temperature dissolution, and is typically from 80° C. to 130° C., preferably from 90° C. to 120° C. in the case of the pressure dissolution. A dissolution time is typically from 1 hour to 20 hours, preferably from 2 hours to 15 hours, particularly preferably from 3 hours to 10 hours. When the dissolution time is excessively short, the undissolved matter tends to remain, and when the dissolution time is excessively long, the productivity tends to be reduced.

In addition, in the dissolving step, a stirring blade is, for example, a paddle, FULLZONE, MAXBLEND, TWIN-STAR, anchor, ribbon, or propeller stirring blade.

Further, after the dissolution, the resultant PVA resin aqueous solution is subjected to degassing treatment, and a method for such degassing is, for example, static degassing, vacuum degassing, or biaxial extrusion degassing. Of those, the static degassing or the biaxial extrusion degassing is preferred.

The static degassing is performed at a temperature of typically from 50° C. to 100° C., preferably from 70° C. to 95° C., and its degassing time is typically from 2 hours to 30 hours, preferably from 5 hours to 20 hours.

The film-forming raw material formed of the aqueous dispersion or the aqueous solution is passed through a slit, such as a T-die, is cast on a cast surface, such as the metal surface of an endless belt or a drum roll, or the surface of a plastic substrate, for example, a polyethylene terephthalate film, is dried, and is further subjected to heat treatment as required. Thus, the water-soluble film can be obtained.

For example, the film formation may be performed under film formation conditions described below.

The temperature of a portion configured to eject the aqueous dispersion or aqueous solution of the resin composition is preferably from 60° C. to 98° C., particularly preferably from 70° C. to 95° C. When such temperature is excessively low, time for the drying tends to lengthen to reduce the productivity of the water-soluble film. When the temperature is excessively high, foaming or the like tends to occur in the aqueous dispersion or the aqueous solution.

At the time of the film formation, a film formation speed is preferably from 3 m/min to 80 m/min, particularly preferably from 5 m/min to 60 m/min, more preferably from 8 m/min to 50 m/min.

In addition, the heat treatment may be performed with a heat roll, and floating, far-infrared ray treatment, and the like are also given as other examples of a method for the treatment. In particular, the heat treatment is preferably performed with the heat roll in terms of the productivity. A heat treatment temperature is preferably from 50° C. to 150° C., particularly preferably from 70° C. to 130° C., and a heat treatment time is preferably from 1 second to 60 seconds, particularly preferably from 3 seconds to 50 seconds, more preferably from 5 seconds to 40 seconds.

In addition, the water-soluble film may be obtained by: casting the aqueous dispersion or aqueous solution of the resin composition on a plastic substrate, such as a polyethylene terephthalate film or a polyethylene film, or a metal substrate with an applicator; and drying the aqueous dispersion or the aqueous solution.

In the present disclosure, the film formation is preferably performed under an environment at, for example, from 10° C. to 35° C., in particular, from 15° C. to 30° C. The humidity at which the film formation is performed is typically 70% RH or less.

The thickness of the water-soluble film obtained as described above, which is appropriately selected in accordance with its applications and the like, is preferably from 10 μm to 120 μm, more preferably from 30 μm to 110 μm, particularly preferably from 45 μm to 100 μm. When such thickness is excessively small, the mechanical strength of the water-soluble film tends to be reduced. When the thickness is excessively large, the rate at which the water-soluble film is dissolved in water tends to be reduced, and the efficiency of film formation also tends to be reduced.

The width of the water-soluble film, which is also appropriately selected in accordance with the applications and the like, is preferably from 300 mm to 5,000 mm, more preferably from 500 mm to 4,000 mm, particularly preferably from 800 mm to 3,000 mm. When such width is excessively small, the production efficiency of the film tends to be reduced, and when the width is excessively large, it tends to be difficult to control the sagging or thickness of the film.

The length of the water-soluble film, which is also appropriately selected in accordance with the applications and the like, is preferably from 500 m to 20,000 m, more preferably from 800 m to 15,000 m, particularly preferably from 1,000 m to 10,000 m. When such length is excessively small, labor tends to be required in the switching of the film. When the length is excessively large, the appearance of the film tends to be poor owing to its tight winding, or the weight thereof tends to be excessively heavy.

In addition, the surface of the water-soluble film may be plain, but in terms of the blocking resistance of the film, the slidability thereof at the time of its processing, the alleviation of adhesiveness between the films serving as products, and the appearance thereof, it is preferred that one surface or both surfaces of the water-soluble film be subjected to texturing processing for imparting, for example, an embossed pattern, a fine uneven pattern, or a special engraving design.

At the time of such texturing processing, a processing temperature is typically from 60° C. to 150° C., preferably from 80° C. to 140° C. A processing pressure is typically from 2 MPa to 8 MPa, preferably from 3 MPa to 7 MPa. A processing time is typically from 0.01 seconds to 5 seconds, preferably from 0.1 seconds to 3 seconds, though the processing time varies depending on the processing pressure and the film formation speed.

In addition, cooling treatment may be performed after the texturing processing treatment as required for preventing unintentional stretching of the water-soluble film due to heat.

In addition, in the present disclosure, the water content of the resultant water-soluble film is preferably from 3 wt. % to 15 wt. % in terms of its mechanical strength and sealability, and is particularly preferably from 5 wt. % to 14 wt. %, more preferably from 6 wt. % to 13 wt. %. When such water content is excessively low, the water-soluble film tends to be excessively hard, and when the water content is excessively high, its blocking is liable to occur. The adjustment of the water content to such value may be achieved by appropriately setting a drying condition and a humidification condition.

The water content is measured in conformity with JIS K 6726 3.4, and the value of the resultant volatile content is defined as the water content.

The resultant water-soluble film is useful in, for example, various packaging applications, and is particularly useful in an application where a liquid chemical agent or the like is packaged as a unit.

<Liquid Chemical Agent Package>

The liquid chemical agent package of the present disclosure is obtained by including the liquid chemical agent in the package bag formed of the water-soluble films. In addition, the package is configured as follows: the package holds such a shape as to include the liquid chemical agent therein at the time of its conveyance or storage; and at the time of its use (e.g., at the time of washing), the package bag formed of the water-soluble films is brought into contact with water to be dissolved therein, and the liquid chemical agent included therein flows out and diffuses into the water, and hence the chemical agent is brought into contact with an object to exhibit its chemical effect.

With regard to the size of the liquid chemical agent package, its length is typically from 10 mm to 50 mm, preferably from 20 mm to 40 mm. In addition, the film thickness of the package bag formed of the water-soluble films is typically from 10 μm to 120 μm, preferably from 30 μm to 110 μm, particularly preferably from 45 μm to 100 μm. The amount of the liquid chemical agent to be included in the package bag is typically from 5 mL to 50 mL, preferably from 10 mL to 40 mL.

<Liquid Chemical Agent to be Included>

The liquid chemical agent to be included in the package bag formed of the water-soluble films is not particularly limited, and may be any one of an alkaline chemical agent, a neutral chemical agent, and an acidic chemical agent. However, in terms of the water solubility of each of the water-soluble films, the pH value of the liquid chemical agent when dissolved or dispersed in water is preferably from 6 to 12, particularly preferably from 7 to 11.

In addition, in terms of the water solubility of each of the water-soluble films, the water content of the liquid chemical agent is preferably 15 wt. % or less, particularly preferably from 0.1 wt. % to 10 wt. %, more preferably from 0.1 wt. % to 7 wt. %.

The pH value is measured in conformity with JIS K 3362 8.3. In addition, the water content is measured in conformity with JIS K 3362 7.21.3.

Although the viscosity of the liquid chemical agent is not particularly limited as long as the chemical agent is a liquid chemical agent that is fluid and changes its shape in accordance with a container, the viscosity is preferably from 10 mPa·s to 200 mPa·s. The viscosity of such liquid chemical agent is measured with a B-type rotary viscometer under normal temperature.

Examples of the liquid chemical agent include liquid chemical agents to be used for, for example, various kinds of washing, such as the laundry of clothing and the like, and the washing of eating utensils and the like, sterilization, and surface finish. Specific examples thereof include a liquid detergent, a fabric softener, an aromatic finishing agent, and a bleaching/sterilizing agent. The water-soluble film is preferably used for the liquid detergent out of those described above.

<Method of Producing Liquid Chemical Agent Package>

A known production method can be used as a method of producing the liquid chemical agent package of the present disclosure, and the package can be produced by, for example, a method including: a step of forming one of the water-soluble films into a container shape; a step of filling the container-shaped water-soluble film with the liquid chemical agent; and a sealing step of bonding and crimping the water-soluble films to each other.

Specifically, the water-soluble film is mounted on a die in which many recessed portions are arranged, and the die is heated to high temperature (e.g., from 50° C. to 60° C.) to soften the water-soluble film. Then, the water-soluble film is formed into an uneven shape along the respective recessed portions by vacuum forming. After that, the liquid chemical agent weighed in a predetermined amount is filled into each recessed portion of the water-soluble film, and another water-soluble film is superimposed thereon. Then, the openings of the respective recessed portions are sealed. Thus, an intermediate formed article having hermetically sealed therein predetermined amounts of the liquid chemical agent is obtained. Then, the intermediate formed article is removed from the die, and is cut into individual pieces. Thus, a liquid chemical agent package of a unit packaging type can be obtained.

In the present disclosure, the package is preferably produced by a method including, as the sealing step of bonding and crimping the water-soluble films to each other, a sealing step of crimping (water-sealing) the water-soluble films via the inorganic particle-dispersed water (α).

Particularly when the liquid chemical agent package of the present disclosure is produced by a method including the sealing step, a satisfactory liquid chemical agent package that has high adhesiveness of a water-sealed portion, and is hence excellent in sealability and free of liquid leakage and the like can be obtained.

As the sealing step of bonding and crimping the water-soluble films to each other, specifically, the water-soluble films are preferably bonded to each other after the inorganic particle-dispersed water (α) containing 0.1 wt. % to 50 wt.

% of inorganic particles having an average particle diameter of 2 μm or more has been applied to the bonding surface of at least one of the water-soluble films.

The inorganic particle-dispersed water (α) preferably contains 0.1 wt. % to 50 wt. % of the inorganic particles, and contains more preferably 0.5 wt. % to 30 wt. %, particularly preferably 1 wt. % to 20 wt. %, still more preferably 3 wt. % to 15 wt. % of the inorganic particles in terms of the sealability. When such content is excessively small, the water sealing strength of the water-sealed portion tends to be reduced, and when the content is excessively large, the number of the inorganic particles on a sealing end surface tends to be so large that a crack occurs.

In the sealing step, the water-soluble films are preferably bonded to each other by: applying the inorganic particle-dispersed water (α) to the bonding surface of at least one of the water-soluble films; and applying a pressure of from 0.01 MPa to 10 MPa.

In addition, in the application of the inorganic particle-dispersed water (α), the inorganic particle-dispersed water (α) is preferably applied to the bonding surface of the water-soluble film in an amount of from 0.5 g/cm$^2$ to 50 g/cm$^2$ in terms of the sealability, and is applied thereto at more preferably from 1 g/cm$^2$ to 40 g/cm$^2$, particularly preferably from 1.5 g/cm$^2$ to 20 g/cm$^2$. When such application amount is excessively small, the water sealing strength tends to be reduced, and when the application amount is excessively large, the applied surface tends to be broken by water.

A package-producing apparatus is preferably used in the production of the liquid chemical agent package. Specifically, first, a water-soluble film (bottom film) is fixed onto a die present in the lower portion of the apparatus, and a water-soluble film (top film) is also fixed to the upper portion of the apparatus. After that, the bottom film is vacuum-formed in accordance with the shape of the die by, for example, heating the bottom film for from 1 second to 20 seconds with a dryer configured to produce hot air at from 50° C. to 120° C. The formed bottom film is filled with the liquid chemical agent. Then, the inorganic particle-dispersed water (α) is applied to the top film, and the top film and the bottom film are crimped to each other to provide the liquid chemical agent package of the present disclosure.

Thus, the liquid chemical agent package of the present disclosure having the liquid chemical agent included in the package bag formed of the water-soluble films is obtained.

EXAMPLES

The present disclosure is more specifically described byway of Examples. The present disclosure is not limited to Examples below without departing from the gist of the present disclosure.

The terms "part (s)" and "%" in the examples are on a weight basis.

Prior to Examples, a carboxyl group-modified PVA and two kinds of unmodified PVAs different from each other in 4% aqueous solution viscosity at 20° C. described below were prepared, and a water-soluble film was formed by using the materials and prepared for Examples and Comparative Example.

Carboxyl group-modified PVA (A1-1): 4% aqueous solution viscosity at 20° C.: 22 mPa·s, average saponification degree: 94 mol %, modification amount with maleic acid monomethyl ester: 2.0 mol %

Unmodified PVA (A2-1): 4% aqueous solution viscosity at 20° C.: 40 mPa·s, average saponification degree: 88 mol %

Unmodified PVA (A3-1): 4% aqueous solution viscosity at 20° C.: 5 mPa·s, average saponification degree: 88 mol %

[Production of Water-Soluble Film]

90 Parts of the carboxyl group-modified PVA (A1-1), 8 parts of the unmodified PVA (A2-1), and 2 parts of the unmodified PVA (A3-1) serving as the PVA resin (A), 20 parts of sorbitol (b1) and 20 parts of glycerin (b2) serving as the plasticizer (B), 8 parts of starch (average particle diameter: 20 μm) serving as the filler (C), 1.4 parts of a polyoxyalkylene alkyl ether phosphate monoethanolamine salt serving as the surfactant (D), and water were mixed, and the mixture was subjected to dissolution treatment to provide a PVA aqueous solution having dispersed therein the starch (solid content concentration: 25%).

The resultant PVA aqueous solution was degassed at 80° C., and was cooled to 40° C. The PVA aqueous solution was cast on a polyethylene terephthalate film, and the resultant was passed through the inside of a 3-meter drying chamber (105° C.) at a speed of 0.35 m/min to be dried. Thus, a PVA water-soluble film (water content: 5%) having a thickness of 89 μm was obtained.

Example 1

(Preparation of Measurement Test Piece)

After the temperature and humidity of an environment surrounding the PVA water-soluble film obtained in the foregoing had been controlled to 23° C. and 40% RH, respectively over 24 hours, the PVA water-soluble film of a square shape measuring 50 mm by 50 mm was cut out of a central portion in the width direction of the film so that one side thereof was parallel to an MD direction (flow direction). Thus, a PVA water-soluble film (1) was obtained. In addition, the PVA water-soluble film was cut out of the central portion in the width direction of the film so as to be such a rectangle that the length of one side parallel to the MD direction (flow direction) was 70 mm and the length of one side parallel to a TD direction (width direction) was 15 mm. Thus, a PVA water-soluble film (2) was obtained.

The PVA water-soluble film (1) was mounted on a 30-centimeter square glass plate with its cast surface directed upward, and silica particle-dispersed water having dispersed therein silica particles (manufactured by Fuji Silysia Chemical Ltd., average particle diameter: 8 μm) serving as inorganic particles at a concentration of 9% (hereinafter sometimes abbreviated as "dispersed water") was applied to the PVA water-soluble film (1) in the shape of a circle having a diameter of 1 cm and in an application amount of 1 g/cm$^2$ with a swab (antibacterial swab manufactured by Justneo Co., Ltd.) caused to sufficiently contain the dispersed water. After that, the cast surface side of the PVA water-soluble film (2) serving as another film was mounted on the PVA water-soluble film (1) 5 seconds after the application of the dispersed water, and a weight of 85 g was slowly mounted to water-seal (bond) the two PVA water-soluble films.

Example 2

Water-sealed PVA water-soluble films were produced in the same manner as in Example 1 except that the concentration of the silica particle-dispersed water to be used was changed to 5%.

Example 3

Water-sealed PVA water-soluble films were produced in the same manner as in Example 1 except that the concentration of the silica particle-dispersed water to be used was changed to 1%.

Comparative Example 1

Water-sealed PVA water-soluble films were produced in the same manner as in Example 1 except that the silica particle-dispersed water to be used was changed to distilled water.

The water-sealed PVA water-soluble films were each subjected to measurement as described below. The results are shown in Table 1 to be described later.

[Method of Measuring Number of Inorganic Particles in Sealed Sectional Portion]

As illustrated in FIG. 1A and FIG. 1B (FIG. 1A: plan view, FIG. 1B: side view), the water-sealed PVA water-soluble films 2 were fixed by being sandwiched between the jigs 1 from both sides. After that, a razor (manufactured by FEATHER Safety Razor Co., Ltd; 099001) was slid in a horizontal direction above the jigs to cut the water-soluble films 2 protruding from the jigs 1. Thus, the sealed sectional portion of the water-soluble films 2 was formed.

The number of the inorganic particles in the sealed sectional portion was measured with a digital microscope (manufactured by HIROX Co., Ltd., KH-8700).

The sealed sectional portion fixed with the jigs 1 illustrated in each of FIG. 1A and FIG. 1B was mounted on the stage of the digital microscope, and the surface of the sealed sectional portion (uneven surface) was observed with the digital microscope, followed by the counting and measurement of the number of the inorganic particles each having a particle diameter of 2 µm or more, which were present in a range having a width corresponding to a linear distance along a sealing interface of 900 µm, the range extending from the interface between the bonding surfaces of the water-soluble films 2 by ±10 µm in a vertical direction. The measurement of the number of the inorganic particles was performed in a field of view at a magnification on a 15-inch monitor of 1,000. The results are shown in Table 1.

[Measurement of Peel Strength of Water-Sealed Portion]

After the water-sealed PVA water-soluble films had been left to stand for 10 seconds, the lower PVA water-soluble film (1) was fixed to a substrate glass, and a spring balance was attached to an end surface of the upper PVA water-soluble film (2) and pulled upward at a rate of 2 mm/sec to measure the peel strength (g/15 mm) of the water-sealed portion. As the peel strength of the water-sealed portion becomes larger, the sealed portion has higher adhesiveness and is hence more excellent in water sealability. The measurement was performed under an environment at 23° C. and 40% RH. The results are shown in Table 1.

TABLE 1

|  | Number of inorganic particles | Peel strength (g/15 mm) 5 seconds* |
| --- | --- | --- |
| Example 1 | 96 particles | 170 |
| Example 2 | 92 particles | 160 |
| Example 3 | 51 particles | 150 |
| Comparative Example 1 | 0 particle | 130 |

*A time period from the end of water application to water sealing

In each of Examples 1 to 3 described above, 20 or more inorganic particles each having a particle diameter of 2 µm or more are incorporated into the sealed sectional portion obtained by bonding the PVA water-soluble films to each other, and hence it has been found that the peel strength of the water-sealed portion is high, and as a result, even under a state in which a package is produced by packaging a liquid chemical agent, no concern is raised about the liquid leakage of the liquid chemical agent. In contrast, in Comparative Example 1 that does not contain 20 or more inorganic particles each having a particle diameter of 2 µm or more in the sealed sectional portion obtained by bonding the PVA water-soluble films to each other, it has been found that the peel strength of the water-sealed portion is low, and hence a concern about liquid leakage remains and a more satisfactory liquid chemical agent package can be formed using any one of the products of Examples.

In addition, when a package is produced by packaging a liquid chemical agent through water sealing involving using the PVA water-soluble films and the dispersed water used in Example 1, a package free of any concern about liquid leakage can be obtained.

Further, with regard to each of Example 1 and Comparative Example 1, the two PVA water-soluble films were water-sealed in the same manner as in Preparation of Measurement Test Piece described above except that the time period from the wetting of the PVA water-soluble film (1) with the dispersed water to the mounting of the cast surface side of the PVA water-soluble film (2) was changed from 5 seconds to 10 seconds, followed by the measurement of the peel strength of the water-sealed portion. The results are shown in Table 2.

TABLE 2

|  | Number of inorganic particles | Peel strength (g/15 mm) 10 seconds* |
| --- | --- | --- |
| Example 1 | 96 particles | 150 |
| Comparative Example 1 | 0 particle | 100 |

*A time period from the end of water application to water sealing

As can be seen from the results of Table 2 described above, in Example 1 containing 20 or more inorganic particles each having a particle diameter of 2 µm or more in the sealed sectional portion obtained by bonding the PVA water-soluble films to each other, even when the time period from the end of the application of the dispersed water to the water sealing lengthens, a liquid chemical agent package that has a high peel strength of the water-sealed portion, and that is hardly affected by the lapse of the time period from the end of the application of the water to the water sealing and hence can maintain high sealability can be obtained.

Specific modes in the present disclosure have been described in Examples described above, but Examples described above are merely illustrative and should not be construed as being limitative. Various modifications apparent to a person skilled in the art are meant to fall within the scope of the present disclosure.

The liquid chemical agent package of the present disclosure can be used in various packaging applications, and is useful in an application where a chemical agent or the like, in particular, a liquid detergent, is packaged as a unit.

REFERENCE SIGNS LIST 1 jig
2 water-soluble film 3 interface
4 inorganic particle
y linear distance along sealing interface of 900 μm
z distance from sealing interface in vertical direction of ±10 μm

The invention claimed is:

1. A liquid chemical agent package, comprising:
a package bag comprising water-soluble films each comprising a polyvinyl alcohol resin (A), the films being bonded to each other to form the package bag; and
a liquid chemical agent included in the package bag,
wherein in a section of the chemical agent package in a vertical direction relative to bonding surfaces of the water-soluble films, the liquid chemical agent package contains 20 or more inorganic particles each having a particle diameter of 2 μm or more in a sealed sectional portion:
having a range extending from an interface between the bonding surfaces by ±10 μm in the vertical direction and
having a width of 900 μm.

2. The liquid chemical agent package according to claim 1, wherein the polyvinyl alcohol resin (A) comprises an anionic group-modified polyvinyl alcohol resin and an unmodified polyvinyl alcohol.

3. The liquid chemical agent package according to claim 1, wherein the water-soluble films each further comprise a plasticizer (B).

4. The liquid chemical agent package according to claim 1, wherein the water-soluble films each have a water content of from 3 wt. % to 15 wt. %.

5. The liquid chemical agent package according to claim 1, wherein the liquid chemical agent shows a pH value of from 6 to 12 when dissolved or dispersed in water, and the liquid chemical agent has a water content of 15 wt. % or less.

6. A method of producing a liquid chemical agent package having a liquid chemical agent included therein comprising:
bonding water-soluble films each comprising a polyvinyl alcohol resin (A) to each other, and
applying inorganic particle-dispersed water (α) containing 0.1 wt. % to 50 wt. % of inorganic particles having an average particle diameter of 2 μm or more to a bonding surface of at least one of the water-soluble films before the bonding of the water-soluble films.

7. The method of producing a liquid chemical agent package according to claim 6, wherein the inorganic particle-dispersed water (α) is applied to the bonding surface of the water-soluble film in an amount of from 0.5 g/cm$^2$ to 50 g/cm$^2$.

* * * * *